United States Patent
Nagayama et al.

[11] Patent Number: 6,139,616
[45] Date of Patent: Oct. 31, 2000

[54] RUST-PREVENTIVE PIGMENT COMPOSITION AND RUST-PREVENTIVE PAINTS CONTAINING THE SAME

[75] Inventors: Takahiro Nagayama; Minoru Yokoyama, both of Tokyo, Japan

[73] Assignees: Nippon Chemical Industrial Co., LTD; Toho Ganryo Kogyo Co., Ltd., both of Tokyo, Japan

[21] Appl. No.: 09/269,196

[22] PCT Filed: Jul. 30, 1998

[86] PCT No.: PCT/JP98/03400

§ 371 Date: Mar. 30, 1999

§ 102(e) Date: Mar. 30, 1999

[87] PCT Pub. No.: WO99/06492

PCT Pub. Date: Feb. 11, 1999

[30] Foreign Application Priority Data

Jul. 31, 1997 [JP] Japan .................................. 9-206687
Dec. 24, 1997 [JP] Japan .................................. 9-355274

[51] Int. Cl.$^7$ ................ C09D 5/08; C01F 11/00; C01G 9/00; C01B 25/18
[52] U.S. Cl. ................ 106/431; 106/14.44; 106/461; 106/462; 106/466; 106/477; 106/426; 106/14.05
[58] Field of Search .............. 106/14.05, 14.44, 106/431, 461, 462, 466, 477, 426

[56] References Cited

FOREIGN PATENT DOCUMENTS

| 11-49975 | 2/1999 | Japan . |
| 11-49976 | 2/1999 | Japan . |
| 11-49977 | 2/1999 | Japan . |
| 11-49978 | 2/1999 | Japan . |
| 11-49979 | 2/1999 | Japan . |
| 11-49980 | 2/1999 | Japan . |
| 11-49981 | 2/1999 | Japan . |
| 11-92692 | 4/1999 | Japan . |

*Primary Examiner*—Anthony Green
*Attorney, Agent, or Firm*—Oblon, Spivak, McClelland, Maier & Neustadt, P.C.

[57] ABSTRACT

The present invention relates to an anti-corrosive pigment composition, characterized by comprising, as main components, white anti-corrosive pigment and an inorganic anion exchanger represented by the following formula (1):

$$(3-4)[M_1]O \cdot Al_2O_3 \cdot [M_2]X_{2/m} \cdot nH_2O \qquad (1)$$

(wherein, $M_1$ and $M_2$ are at least one selected from $Ca^{2+}$ or $Zn^{2+}$, X represents at least one anion selected from $NO_2^-$, $NO_3^-$ or $MoO_4^{2-}$, m represents a valency of the anion, and n is 20 or less).

4 Claims, No Drawings

RUST-PREVENTIVE PIGMENT COMPOSITION AND RUST-PREVENTIVE PAINTS CONTAINING THE SAME

TECHNICAL FIELD

The present invention relates to a non-polluting white anti-corrosive pigment composition that is useful for preventing corrosion of metals, and a rust-preventive coating containing the same.

BACKGROUND OF THE INVENTION

Plumbates such as red lead, lead suboxide, lead cyanamide, calcium plumbate or basic lead sulfate, and chromates such as basic potassium zinc chromate, tetrabasic zinc chromate, barium chromate, calcium chromate or strontium chromate have mainly been us ed as an anti-corrosive pigment. Nevertheless, although these anti-corrosive pigments exhibit excellent rust-prevention performance with metals, their use is being restricted in view of health and environmental protection problems.

As non-pollution type anti-corrosive pigments to be used in place of those pigments, non-pollution and harmless anti-corrosive pigments such as phosphates such as zinc phosphate, magnesium calcium phosphate, titanium phosphate or silica phosphate; condensed phosphates such as aluminum triphosphate; phosphites such as zinc phosphite, calcium phosphite, strontium phosphite or aluminum phosphite; zinc molybdate; calcium molybdate; barium borate; zinc borate, and the like, have been developed, and are being partially put into practical use.

However, since these are not comparable to the chromic salt-type or plumbate-type pigments, pigments having stronger rust-prevention are demanded. There has been proposed, for example, non-pollution-type white anti-corrosive pigments, such as basic zinc phosphite (Japanese Patent Laid-open No. Sho 50-50297), zinc hydroxyphosphite complex (Japanese Patent Laid-open No. Sho 58-194725), an anti-corrosive pigment by the reaction product of zinc phosphite and zinc white (Japanese Patent Laid-open No. Sho 57-109862), an anti-corrosive pigment of potassium zinc phosphite-type (Japanese Patent Laid-open No. Sho 58-84109, Japanese Patent Laid-open No. Sho 59-20466), calcium zinc phosphite-type (Japanese Patent Laid-open No. Hei 3-111457), plate-like calcium phosphite-type (Japanese Patent Laid-open No. Hei 3-285808), an anti-corrosive pigment obtained by chemically modifying the surface of condensed phosphate and zinc compound and/or borate compound (Japanse Patent Laid-open No. Hei 2-151664), an anti-corrosive pigment in which an organophosphorus compound having a chelate ability is contained in zinc phosphite and/or calcium phosphite (Japanse Patent Application Laid-open No. Hei 6-93478), an anti-corrosive pigment comprising an anti-corrosive pigment obtained by reaction treating zinc oxide with an organophosphoric acid having a chelate ability, and a mixture of this anti-corrosive pigment and a white anti-corrosive pigment of phosphate-type or phosphite-type (Japanese Patent Laid-open No. Hei 6-122986) and the like.

Although the above-mentioned non-pollution-type anti-corrosive pigments may be expected to have an effect to a certain extent, and although, non-pollution-type anti-corrosive pigments for electro-deposition coatings and coil coating system used in coating automobiles, electric appliances and the like are particularly urgently needed, one that is comparable with plumbates or chromates has not yet been put into practical use.

On the other hand, with regard to coatings containing these anti-corrosive pigments, substitution to water base coating from the conventional solvent-type coating is being requested from the stand point of environmental problems, and the development of non-pollution-type rust-preventive coating exhibiting more effective rust-prevention is desired.

As the result of extensive research on non-pollution type anti-corrosive pigments in view of the above-mentioned circumstances, the present inventors have found that an anti-corrosive pigment composition containing, as main components, white anti-corrosive pigment and inorganic anion exchanger carrying $NO_2^-$, $NO_3^-$ or $MoO_4^{2-}$ has excellent rust-prevention and shows stable pigment characteristics, and completed the present invention.

SUMMARY OF THE INVENTION

That is, the present invention has an object to provide an anti-corrosive pigment that is free of pollution and has excellent rust-prevention performance, and a rust-preventive coating containing the same.

An anti-corrosive pigment composition according to the present invention is characterized by comprising, as main components, white anti-corrosive pigment and inorganic anion exchanger represented by the following formula (1):

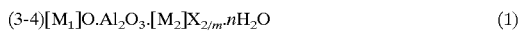
$$(3\text{-}4)[M_1]O \cdot Al_2O_3 \cdot [M_2]X_{2/m} \cdot nH_2O \tag{1}$$

(wherein, $M_1$ and $M_2$ are at least one selected from $Ca^{2+}$ or $Zn^{2+}$, X represents at least one anion selected from $NO_2^-$, $NO_3^-$ or $MoO_4^{2-}$, m represents a valency of the anion, and n is 20 or less).

Further, the rust-preventive coating according to the present invention is structurally characterized by containing the above-mentioned anti-corrosive pigment composition.

DETAILED DESCRIPTION OF THE INVENTION

The present invention will now be described in detail below.

An anti-corrosive pigment composition according to the present invention comprises, as main components, white anti-corrosive pigment and inorganic anion exchanger represented by the above formula (1).

Anti-corrosive pigments which can be used in the present invention are not specifically limited but include any of organic and inorganic pigments, for example, organic anti-corrosive pigment such as nitrile series, and one or more kind of inorganic anti-corrosive pigment selected from the group consisting of phosphorus oxyacid salt, molybdate, phosphorus molybdate, borate, borosilicate, phosphosilicate, chromate and plumbate of one or more kind of metals selected from Mg, Ca, Ba, Sr, Zn or Al. According to the present invention, however, white anti-corrosive pigments derived from phosphorus oxyacid salt, molybdate, phosphomolybdate, borate, borosilicate and phosphosilicate of one or more kind of metals selected from Mg, Ca, Ba, Sr, Zn or Al are preferably used in view of environmental consideration.

Concretly, oxyacid metal salts of phosphorus are phosphites, phosphates and/or condensedphosphates of one or more kind of metals selected from Mg, Ca, Ba, Sr, Zn or Al. Examples of the phosphites include magnesium phosphite, calcium phosphite, barium phosphite, strontium phosphite, zinc phosphite, aluminum phosphite, calcium zinc phosphite and potassium zinc phosphite. Examples of the phosphates include magnesium phosphate, calcium phosphate, barium phosphate, strontium phosphate, zinc phosphate, aluminum phosphate, magnesium zinc phosphate, calcium zinc phosphate, and potassium zinc phosphate.

Examples of the condensed phosphates include calcium polyphosphate, magnesium polyphosphate, zinc polyphosphate, and aluminum polyphosphate, magnasium metaphosphate, calcium metaphosphate, barium metaphosphate, strontium metaphosphate, zinc metaphosphate, aluminium metaphosphate, and so forth.

Examples of molybdates that are a component of the anti-corrosive pigment composition according to the present invention include zinc molybdate, calcium molybdate, barium molybdate, aluminum molybdate, magnesium molybdate, strontium molybdate, calcium molybdate and potassium zinc molybdate.

Examples of phosphomolybdates include zinc phosphomolybdate, calcium phosphomolybdate, barium phosphomolybdate, aluminum phosphomolybdate, magnesium phosphomolybdate, strontium phosphomolybdate and potassium zinc phosphomolybdate.

As borates, for example, zinc borate, calcium borate, barium borate, aluminum borate, magnesium borate, strontium borate, calcium zinc borate and potassium zinc borate are given.

As borosilicates, for example, zinc borosilicate, calcium borosilicate, barium borosilicate, aluminum borosilicate, magnesium borosilicate, strontium borosilicate, potassium zinc borosilicate, strontium calcium borosilicate and zinc strontium calcium borosilicate are mentioned.

Examples of phosphosilicates include zinc phosphosilicate, calcium phosphosilicate, barium phosphosilicate, aluminum phosphosilcate, magnesium phosphosilicate, strontium phosphosilicate, potassium zinc phosphosilicate, calcium zinc phosphosilicate and calcium zinc strontium phosphosilicate.

One or more kinds of these compounds are used, and may be either of a normal salt, a basic salt or composite salt, or a hydrate or an anhydride.

In inorganic anion exchanger represented by the above-mentioned general formula (1), x includes, for example, $OH^-$, $CO_3^{2-}$, $SO_4^{2-}$, $MoO_4^{2-}$, $CrO_4^{2-}$, $WO_4^{2-}$, $NO_3^-$ and $NO_2^-$. In the present invention, $NO_3^-$, $NO_2^-$ and $MoO_4^{2-}$ are particularly preferable in the passive state-formation action of $Fe^{2+}$. Further. m represents the valency of the anion, and n is 20 or less. anion X is not all occupied by one kind, and in many cases, the anion X is constituted by a composite anion.

Production of such an inorganic anion exchanger may be made in accordance with conventional production processes. For example, in case of production of calcium salt, a process of crystallizing using a raw material comprising sodium aluminate, a soluble calcium salt and/or alkali metal salt, and hydrated lime (Japanese Patent Laid-open No. Hei 7-33430), and a process of reacting $CaO$—$Al_2O_3$ compounds with a soluble calcium salt and/or hydrated lime in a liquid, and then crystallizing (Japanese Patent Laid-open No. Hei 7-33431), and in case of zinc salt, a process of crystallizing using a raw material comprising sodium aluminate and a soluble zinc salt are industrially advantageous, but the method for producing the inorganic anion exchanger is not limited thereto.

The inorganic anion exchanger content in the pigment composition is 0.5–20% by weight, preferably 1–10% by weight. If the content is smaller than 0.5% by weight, the rust-prevention performance is not exhibited. On the other hand, if the content exceeds 20% by weight, the effect is saturated, and in particular, when a a water base coating is formed, performance of a coating film, water resistance and coating stability tend to deteriorate. Moreover, the raw material itself is expensive, which makes this uneconomical.

To obtain the anti-corrosive pigment composition of the present invention, each component is blended to obtain a blend of uniform composition in the above-mentioned proportion, and the composition is prepared by a wet method or a dry method with a mechanical means in which a strong shear force acts. The wet method is conducted with an apparatus such as a ball mill, a disper mill, homogenizer, a vibrating mill, a sand-grinding mill, an attrition mill, or an intensive stirrer. On the other hand, in the dry method, an apparatus such as a high-speed mixer, a super mixer, a turbosphere mixer, a Nauter mixer or a ribbon blender is used. Nevertheless, these uniform blending operations are not limited to the exemplified mechanical means. Further, if desired, grinding treatment may be conducted with, for example, a jet mill to adjust the particle size.

The above-mentioned anti-corrosive pigments may optionally be surface-treated with acidic phosphoric ester and/or phosphoric acid having a chelate ability, or with organophosphonic compounds selected from derivatives thereof.

Examples of the acidic phosphoric ester include methylacid phosphate, dimethylacid phosphate, ethylacid phosphate, diethylacid phosphate, methylethylacid phosphate, ortho- or iso-propylacid phosphate, ortho- or iso-dipropylacid phosphate, methylbutylacid phosphate, ethylbutylacid phosphate, propylbutylacid phosphate, ortho- or iso-octylacid phosphate, ortho- or iso-dioctylacid phosphate, ortho-decylacid phosphate, ortho-didecylacid phosphate, ortho-laurylacid phosphate, ortho-diluarylacid phspahte, ortho- or iso-cetylacid posphate, ortho- or iso-dicetylacid phosphate, ortho-stearylacid phosphate, ortho- or iso-distearylacid phosphate, allyacid phosphate, and diallyacid phosphate. Examples also include salts of one or more kind of metals selected from Mg, Ca, Sr, Ba, Zn or Al, or ammonium salts, of these compounds.

Representative examples of the compound of phosphonic acid having a chelate ability include aminoalkylene phosphonic acid, ethylenediaminetetrralkylene phosphonic acid, alkylmethane-1-hydroxy-1,1-diphosphonic acid and 2-hydroxyphosphonoacetic acid. Of those, examples of the aminoalkylene phosphonic acid include nitrilostyrene phosphonic acid, nitrilotrispropylene phosphonic acid, nitrilodiethylmethylene phosphonic acid, and nitrilopropylbismethylene phosphonic acid. Examples of the ethhylenediaminetetralkylene phosphonic acid include ethylenediaminetetramethylene phosphonic acid, ethylenediaminetetraethylene phosphonic acid, and ethylenediaminetetrapropylene phosphonic acid. Examples of the alkylene-1-hydroxy-1,1-diphyosphonic acid include methane-1-hydroxy-1,1-diphosphonic acid, ethane-1,1-hydroxy-1,1-diphosphonic acid, and propane-1-hydroxy-1,1-diphosphonic acid. The above examples may be salts of one kind or two or more kind of metals selected from Mg, Ca, Sr, Ba, Zn or Al, but the examples are not limited to these compounds.

The above-mentioned acidic phosphoric ester and compounds of phosphoric acid having a chelate ability may be used as one kind or as a combination of two or more kinds.

The mixing amount of the acidic phosphate and/or phosphonic acid having a chelate ability to the anti-corrosive pigment depends on the physical properties or kinds of compound to be used, but is generally 0.1–30% by weight, and preferably 1–10% by weight.

Further, when the pigment composition is formed into coating, zinc oxide may be used therein if desired in order to impart excellent coating characteristics thereto. In this case, the content of zinc oxide in the pigment composition may be in the range of 10–60% by weight. In addition, zinc oxide may be surface treated with the above-mentioned acidic phosphate and/or phosphoric acid having a chelate ability, or with organophosphoric acid compounds selected from derivatives thereof, white-insoluble fine metal oxide, hydrated oxide, silica or metal silicate.

When using the anti-corrosive pigment comprising the pigment composition according to the present invention, other nitrous acid metal salts, and other auxiliary components may be used together, if necessary.

The anti-corrosive pigment composition of the present invention may further be surface treated, if needed, with a higher fatty acid or a derivative thereof, a surface active agent or a silane coupling agent to improve dispersibility.

The rust-preventive coating of the present invention comprises a coating vehicle having contained therein the above-mentioned anti-corrosive pigment comprising anti-corrosive pigment and inorganic anion exchanger as the main composition. Coating vehicle means a medium that disperses a pigment. That is, the coating vehicle is a polymeric substance such as polymerized oil, a natural or synthetic resin, derivatives of cellulose or rubber, which are coating film-forming components, and a material obtained by dissolving these in a solvent.

Examples of the coating vehicle used in the present invention include phenolic resin, alkyd resin, melamine resin, gaunadine resin, vinyl resin, epoxy resin, polyamine resin, acrylic resin, polybutadiene resin, polyester resin, urethane resin, silicon resin, fluor resin, amino resin and vinyl resin. These may be replaced with a mixed or modified resin according to the need. Further, a solvent generally used in a coating, such as water; alcohols, ketones, aromatic hydrocarbons, e.g., benzenes, toluene or xylene; aliphatic hydrocarbon such as liquid paraffin, mineral sprit can be applied as a diluent.

A mixing amount of the anti-corrosive pigment of the present invention to the coating vehicle is generally 0.3–30% by weight, and preferably 1–20% by weight. If the mixing amount is smaller than 0.3% by weight, the rust-prevention is deteriorated, and if it exceeds 30% by weight, the coating viscosity increases, and preferable coating characteristics can not obtained.

The rust-preventive coating according to the present invention can be subjected to brush or roller coating, spray coating, electrostatic coating, a roll coater, a curtain flow coater, dipping coating or electrodeposition coating.

The anti-corrosive pigment composition according to the present invention comprises, as the main components, non-polluting white anti-corrosive pigment and inorganic anion exchanger being capable of capturing chlorine ion and having a rust preventive effect. Therefore, the composition has excellent rust-prevention, is non-pollution, has low toxicity, is also excellent in pigment characteristics, and the coating stability when the composition is formed into coating is also excellent.

The excellent rust-prevention mechanism of the anti-corrosive pigment composition of the present invention is complicated and has not yet been explained. Nevertheless, it is believed to be attributable to the fact that the capture of corrosive factors such as chlorine ion and others due to strong anion exchange ability of inorganic anion exchanger, acts of Ca and Zn as a base or as an electrode potential, and act of a passive forming of nitrite, nitrate and molybdate ion as chromic acid exhibit a excellent rust-prevention performance combined with an inherent rust-preventive power of the anti-corrosive pigments.

EXAMPLE

Hereinafter, the present invention is explained in detail with reference to examples thereof, but the invention is not limited thereto.

(Type of inorganic anion exchanger

The inorganic anion exchanger represented by the formula (1) and used in the following examples are listed in the Table 1 below.

$$(3-4)[M_1]O \cdot Al_2O_3 \cdot [M_2]X_{2/m} \cdot nH_2O \quad (1)$$

TABLE 1

| Type | kind of $M_1$ | kind of $M_2$ | kind of X |
|------|---------------|---------------|-----------|
| A | Ca | Ca | $NO_2^-$ |
| B | Ca | Ca | $NO_3^-$ |
| C | Ca | Ca | $MoO_4^{2-}$ |
| D | Zn | Zn | $NO_2^-$ |
| E | Zn | Zn | $NO_3^-$ |
| F | Zn | Zn | $MoO_4^{2-}$ |

Examples 1–4

Zinc phosphate and the inorganic anion exchanger A shown in Table 1 were blended in the proportions shown in Table 2, and dry mixed in a high speed mixer at 10,000 rpm for 5 minutes to prepare each anti-corrosive pigment composition.

1 g of each of the anti-corrosive pigments obtained above was added to 100 ml of tap water. The resulting mixtures were stirred with a stirrer at 400–500 rpm, allowed to stand for 5 days, and then filtered. 5 ml of each filtrate was spotted on a degreased and polished SPCC-SD (JIS G3141) steel plate.

Comparative Example 1

An anti-corrosive pigment containing no inorganic anion exchanger was prepared and was spotted on the steel plates.

TABLE 2

| | Anti-corrosive Pigment Composition | |
|---|---|---|
| | Zinc phosphate Amount (wt %) | Inorganic anion exchnger A Amount (wt %) |
| Example 1 | 99.5 | 0.5 |
| Example 2 | 99.0 | 1 |
| Example 3 | 98.0 | 2 |
| Example 4 | 80.0 | 20 |
| Comparative Example 1 | 100 | — |

<Evaluation of primary rust-prevention performance>

After spotting the filtrate, evaluation was made by visual observation of the steel plate surface with the passage of time, and the results are shown in Table 3.

The symbols in Table 3 are as follows.

⊚: Rust did not occur at all.

○: Rust occurred in 10% or less of the area.

Δ: Rust occurd in 10% or more of the area.
×: Rust occurred in all area.

TABLE 3

| | State of Steel Plate Surface | | |
|---|---|---|---|
| | After 2 days | After 4 days | After 7 days |
| Example 1 | ⊙ | ⊙ | ⊙ |
| Example 2 | ⊙ | ⊙ | ⊙ |
| Example 3 | ⊙ | ⊙ | ⊙ |
| Example 4 | ⊙ | ⊙ | ⊙ |
| Comparative Example 1 | X | X | X |

Examples 5–8

Calcium phosphite and the inorganic anion exchanger B shown in Table 1 were blended in the proportions shown in Table 4 and dry mixed in a high speed mixer at 10,000 rpm for 5 minutes to prepare each anti-corrosive pigment composition.

1 g of each of the anti-corrosive pigment compositions obtained above was added to 100 ml of tap water. The resulting mixtures were stirred with a stirrer at 400–500 rpm, allowed to stand for 7 days, and then filtered. 5 ml of each filtrate was spotted on a degreased and polished SPCC-SD steel plate.

Comparative Examples 2

An anti-corrosive pigment to which anion exchanger was not added was prepared, and a filtrate of the pigment was spotted on the steel plates in the same manner.

TABLE 4

| | Anti-corrosive Pigment Composition | |
|---|---|---|
| | Calcium phosphite (Amount: wt %) | Inorganic anion exchanger B (Amount: wt %) |
| Example 5 | 99.5 | 0.5 |
| Example 6 | 99.0 | 1.0 |
| Example 7 | 98.0 | 2.0 |
| Example 8 | 80.0 | 20 |
| Comparative Example 2 | 100 | — |

<Evaluation of primary rust-prevention performance>

After spotting the filtrate, evaluation of rust-prevention performance was made by visual observation of the steel plate surface with the passage of time, and the results are shown in Table 5.

The symbols in the Table are all the same as those defined in the Table 3.

TABLE 5

| | State of Steel Plate Surface | | |
|---|---|---|---|
| | After 2 days | After 4 days | After 7 days |
| Example 5 | ⊙ | ⊙ | ⊙ |
| Example 6 | ⊙ | ⊙ | ⊙ |
| Example 7 | ⊙ | ⊙ | ⊙ |
| Example 8 | ⊙ | ⊙ | ⊙ |
| Comparative Example 2 | ○ | Δ | X |

Examples 9–12

Zinc molybdate and the inorganic anion exchanger C shown in table 1 were blended in the proportions shown in Table 6, and dry mixed with a high speed mixer at 10,000 rpm for 5 minutes to prepare each anti-corrosive pigment composition.

1 g each of the anti-corrosive pigments obtained above was added to 100 ml of tap water. The resulting mixtures were stirred with a stirrer at 400–500 rpm, allowed to stand for 7 days, and then filtered. 5 ml of each filtrate was spotted on a degreased and polished SPCC-SD steel plate.

Comparative Example 3

Anti-corrosive pigment containing no inorganic anion exchanger was spotted on the steel plates in the same manner as in Examples 9–12.

TABLE 6

| | Anti-corrosive Pigment Composition | |
|---|---|---|
| | Zinc molybdate Amount (wt %) | Inorganic anion exchanger C Amount (wt %) |
| Example 9 | 99.5 | 0.5 |
| Example 10 | 99.0 | 1 |
| Example 11 | 98.0 | 2 |
| Example 12 | 80.0 | 20 |
| Comparative Example 3 | 100 | — |

<Evaluation of primary rust-prevention performance>

After spotting the filtrate, evaluation of rust-prevention performance was made by visual observation of the steel plate surface with the passage of time, and the results are shown in Table 7.

The symbols in the Table are all the same as those defined in the Table 3.

TABLE 7

| | State of Steel Plate Surface | | |
|---|---|---|---|
| | After 2 days | After 4 days | After 7 days |
| Example 9 | ⊙ | ⊙ | ⊙ |
| Example 10 | ⊙ | ⊙ | ⊙ |
| Example 11 | ⊙ | ⊙ | ⊙ |
| Example 12 | ⊙ | ⊙ | ⊙ |
| Comparative Example 3 | Δ | X | X |

Examples 13–19

Each of the anti-corrosive pigments and inorganic anion exchanger shown in Table 1 were blended in the proportions shown in Table 8. A high-speed mixer was operated at 2,000 rpm for 5 minutes to prepare each anti-corrosive pigment composition.

1 g of each of the anti-corrosive pigment obtained above was added to 100 ml of tap water. The resulting mixtures were stirred with a stirrer at 400–500 rpm, allowed to stand for 7 days, and then filtered. 5 ml of each filtrate was spotted on a degreased and polished SPCC-SD steel plate.

Comparative Examples 4–10

Anti-corrosive pigment to which inorganic anion exchanger was not added was spotted on the steel plates in the same manner as in Examples 13–19.

TABLE 8

| | Anti-corrosive Pigment Composition | |
|---|---|---|
| | Kind of anti-corrosive pigment (Amount: wt %) | Kind of inorganic anion exchanger (Amount: wt %) |
| Example 13 | Zinc phosphomolybdate (99.5) | Type A (0.5) |
| Example 14 | Zinc borate (99.0) | Type B (1.0) |
| Example 15 | Calcium boroslicate (98.0) | Type A (2.0) |
| Example 16 | Calcium phosphosilicate (97.0) | Type B (3.0) |
| Example 17 | Zinc phosphite (96.0) | Type D (4.0) |
| Example 18 | Aluminium polyphosphate (94.0) | Type E (6.0) |
| Example 19 | Aluminium phosphomolybdate (91.0) | Type F (9.0) |
| Comparative Example 4 | Zinc phosphomolybdate (100) | — |
| Comparative Example 5 | Zinc borate (100) | — |
| Comparative Example 6 | Calcium borosilicate (100) | — |
| Comparative Example 7 | Calcium phosphosilicate (100) | — |
| Comparative Example 8 | Zinc phosphite (100) | — |
| Comparative Example 9 | Aluminum polyphposphate (100) | — |
| Comparative Example 10 | Aluminum phosphomolybdate (100) | — |

<Evaluation of primary rust-prevention performance>

After spotting the filtrate, evaluation of rust-prevention performance was made by visual observation of the steel plate surface with the passage of time, and the results are shown in Table 9. Symbols in the table are all the same as those defined in Table 3.

TABLE 9

| | State of Steel Plate Surface | | |
|---|---|---|---|
| | After 2 days | After 4 days | After 7 days |
| Example 13 | ⊚ | ⊚ | ⊚ |
| Example 14 | ⊚ | ⊚ | ⊚ |
| Example 15 | ⊚ | ⊚ | ⊚ |
| Example 16 | ⊚ | ⊚ | ⊚ |
| Example 17 | ⊚ | ⊚ | ⊚ |
| Example 18 | ⊚ | ⊚ | ⊚ |
| Example 19 | ⊚ | ⊚ | ⊚ |
| Comparative Example 4 | ○ | X | X |
| Comparative Example 5 | ○ | X | X |
| Comparative Example 6 | ○ | X | X |
| Comparative Example 7 | ○ | X | X |
| Comparative Example 8 | ○ | X | X |
| Comparative Example 9 | ○ | X | X |
| Comparative Example 10 | ○ | X | X |

Coatings were prepared using the anti-corrosive pigment compositions obtained in Examples 1–19 and Comparative Examples 1–10, and coating dispersibility and rust-preventive performance were evaluated. The results are shown in Table 11. Also, a coating containing no anti-corrosive pigment was prepared as control sample (Comparative example 11).

(1) Preparation of rust-preventive coating

An ordinary dry-type epoxy resin coating was prepared by adding a curing agent to the main agent having a composition shown in Table 10 prepared according to a paint conditioner method.

TABLE 10

| | Amount added |
|---|---|
| Composition of main agent | |
| EPIKOTE 1001 × 75[1] | 41.665 |
| Xylene/methyl ethyl ketone (1/1/:v/v) | 21 |
| Anti-corrosive pigment | 7.8 |
| Calcium carbonate | 5.0 |
| Titanium oxide | 2.5 |
| Glass bead | 80 |
| Composition of curing agent | |
| TORMIDE 410-N[2] | 48.075 |
| Xylene/isobutanol (7/3:v/v) | 10 |

[1]EPIKOTE 1001 × 75 (a product of Yuka-Shell Epoxy K.K., non-volatile content: 75%)
[2]TORMIDE 410-N (a product of Fuji Kasei Kogyo K.K., non-volatile content: 65%)

(2) Preparation of coated steel plate

The above-mentioned rust-preventive coating was coated on SPCC-SD steel plates of 70×150×0.7 mm, product of Nippon Test Panel Co., with a bar coater such that the dry coat thickness thereof was 30–35 μm, and the plates thus coated were dried in a thermo-hygrostat of 25° C. and a humidity of 60% for 1 week to obtain a coated steel plate.

(3) Evaluation of coating dispersibility

The degree of dispersion of the anti-corrosive pigment was evaluated for the coating prepared in (1) with a grind gauge according to JIS K5101. The results are shown in Table 11, wherein evaluation was made according to following criteria.

Good: Dispersion of 10 μm or less

Fair: Dispersion of 10–50 μm

Poor: Dispersion of 50 μm or more (4) Rust-preventive test

The back surface and edge of the coated steel plates prepared in (2) were masked with 3M Scotch brand tape. A coated surface of the plates were cross-cut and set in a salt spray testing machine, and a rust-preventive test was done.

(5) Evaluation of rust-prevention performance

The results of the 400 hour salt spray test were evaluated according to the following five grades, and the rust-prevention effect of the anti-corrosive pigment was judged.

Grade 5: No rust except for the cross-cut part, and no blistering;

Grade 4: Rust occurred within 2 mm of one side from the cross-cut part, but no blistering;

Grade 3: Rust occurred within 6 mm of one side from the cross-cut part, and partial blistering;

Grade 2: Rust occurred within 12 mm of one side from the cross-cut part, and partial blistering;

Grade 1: Rust and blistering occurred in all area.

TABLE 11

| | Pigment dispersibility | Evaluation of rust-preventive performance |
|---|---|---|
| Example 1 | Good | 5 |
| Example 2 | Good | 5 |
| Example 3 | Good | 5 |
| Example 4 | Good | 5 |
| Example 5 | Good | 5 |
| Example 6 | Good | 5 |

TABLE 11-continued

| | Pigment dispersibility | Evaluation of rust-preventive performance |
|---|---|---|
| Example 7 | Good | 5 |
| Example 8 | Good | 5 |
| Example 9 | Good | 5 |
| Example 10 | Good | 5 |
| Example 11 | Good | 5 |
| Example 12 | Good | 5 |
| Example 13 | Good | 5 |
| Example 14 | Good | 5 |
| Example 15 | Good | 5 |
| Example 16 | Good | 5 |
| Example 17 | Good | 5 |
| Example 18 | Good | 5 |
| Example 19 | Good | 5 |
| Comparative Example 1 | Good | 1 |
| Comparative Example 2 | Good | 3 |
| Comparative Example 3 | Good | 3 |
| Comparative Example 4 | Good | 3 |
| Comparative Example 5 | Good | 3 |
| Comparative Example 6 | Good | 2 |
| Comparative Example 7 | Good | 2 |
| Comparative Example 8 | Good | 3 |
| Comparative Example 9 | Good | 2 |
| Comparative Example 10 | Good | 2 |
| Comparative Example 11 | — | 1 |

INDUSTRIAL APPLICABILITY

As mentioned above, the anti-corrosive pigment composition of the present invention comprises, as main components, non-polluting white anti-corrosive pigment and inorganic anion exchanger. Therefore, the composition is non-polluting, exhibits excellent rust-prevention power, and has stable pigment characteristics. Consequently, the composition is useful as an anti-corrosive pigment for various metals, and coating containing the pigment composition is useful as a rust-preventive coating.

What is claimed is:

1. An anti-corrosive pigment composition comprising, as main components, white anti-corrosive pigment and a rust-preventing effective amount of an inorganic anion exchanger represented by the following formula (1):

$$(3\text{-}4)M_1O \cdot Al_2O_3 \cdot M_2X_{2/m} \cdot nH_2O \qquad (1)$$

wherein, $M_1$ and $M_2$ are at least one selected from the group consisting of $Ca^{2+}$ and $Zn^{2+}$, X represents at least one anion selected from the group consisting of $NO_2^-$, $NO_3^-$, and $MoO_4^{2-}$, m represents a valency of the anion, and n is 20 or less.

2. The anti-corrosive pigment composition as claimed in claim 1, wherein the white anti-corrosive pigment is one or more compounds of a metal and an anion, wherein the anion is one or more selected from the group consisting of phosphorus oxyacid salt, molybdate, phosphomolybdate, borate, borosilicate and phosphosilicate, wherein the metal is one or more metals selected from the group consisting of Mg, Ca, Ba, Sr, Zn and Al.

3. The anti-corrosive pigment composition as claimed in claim 1, wherein the inorganic anion exchanger makes up 0.5–20 weight % of the pigment composition.

4. A rust-preventive coating composition containing the anti-corrosive pigment composition as claimed in claim 1, and a coating vehicle.

* * * * *